United States Patent [19]

Palardy

[11] Patent Number: 5,932,018
[45] Date of Patent: Aug. 3, 1999

[54] TREATMENTS TO IMPROVE YIELDS IN THE WET MILLING OF CORN

[75] Inventor: William J. Palardy, Chalfont, Pa.

[73] Assignee: BetzDearborn Inc., Trevose, Pa.

[21] Appl. No.: 09/013,312

[22] Filed: Jan. 26, 1998

[51] Int. Cl.⁶ .................................................. B02B 9/00
[52] U.S. Cl. ............................... 127/67; 127/29; 127/68; 252/356
[58] Field of Search ................................. 127/29, 67, 68; 252/356

[56] References Cited

U.S. PATENT DOCUMENTS

| | | | |
|---|---|---|---|
| 3,783,139 | 1/1974 | Moneymaker et al. | 127/67 |
| 4,144,087 | 3/1979 | Chwalek et al. | 127/24 |
| 4,207,118 | 6/1980 | Bonnyay et al. | 127/24 |
| 4,244,748 | 1/1981 | Chwalek et al. | 127/67 |
| 4,255,518 | 3/1981 | Muller et al. | 435/161 |
| 4,929,361 | 5/1990 | Polizzotti | 210/698 |
| 4,994,115 | 2/1991 | Giesfeldt et al. | 127/67 |
| 5,073,201 | 12/1991 | Giesfeldt et al. | 127/67 |
| 5,283,322 | 2/1994 | Martin et al. | 530/374 |

*Primary Examiner*—David Brunsman
*Attorney, Agent, or Firm*—Richard A. Paikoff

[57] ABSTRACT

A process to enhance the physical separations in the wet milling process is disclosed. Specifically, a nonionic surfactant esterified with fatty acids acts to reduce the starch content of fiber in the wet milling process, thus increasing the quantity of starch recovered for subsequent processing into higher value products.

3 Claims, No Drawings

TREATMENTS TO IMPROVE YIELDS IN THE WET MILLING OF CORN

BACKGROUND OF THE INVENTION

The wet milling of corn makes available four principal products: starch, gluten feed, gluten meal, and oil. In general, the purposes of the wet milling process are to separate starch and oil in pure form for food use, to isolate a large percentage of the protein in a concentrated form (gluten meal) for food or feed use, and to combine residual fibrous and soluble fractions to produce a feed ingredient (gluten feed) of about 21% protein content. (A complete description of the milling process may be found in the *Kirk—Othmer Encyclopedia of Chemical Technology*, 3rd Edition, Volume 21, p. 492–507, 1983, herein incorporated by reference.)

The several steps of the wet milling process include first passing the corn kernels through mechanical cleaners designed to separate unwanted substances, e.g., cob, sticks, husks, metal and stone, followed by soaking (steeping) the corn for 24 to 48 hours in circulating warm water containing a small amount of sulfur dioxide to inhibit putrefactive fermentation and facilitate softening. The kernels swell appreciably in the steeping; when fully softened, they contain 40% to 50% moisture, their hulls are somewhat loosened, and they are ready for much easier separation of their component parts than would be possible otherwise.

The softened kernels are then degerminated by a milling action in which the rotary action of one plate pressing the kernel against a similar, stationary plate tears the soft kernel apart to free the rubbery germ without crushing it, and with concomitant liberation of a portion of the starch and protein from the endosperm. The germs, being lighter than the other parts of the kernels, float to the surface of the aqueous mixture where they may be skimmed off or, in the case of modern milling plants, separated by hydroclones.

This leaves an aqueous slurry of starch, gluten, fiber and chunks of the softened starch endosperm. Excess water and much of the free starch and protein that were liberated coincident with degermination are separated by screening; the remaining mixture of endosperm chunks and fibrous materials is ground or impacted to a fine mash and washed on a series of screens to retain the fibrous material and hard proteinaceous endosperm particles that resist comminution; the starch and gluten pass through the screen of metal or fabric composition which retains the fibrous and proteinaceous material of largest particle size.

This now leaves only the starch and gluten as an aqueous slurry. This slurry is pumped from the shakers to high speed centrifugal machines. Because of the difference in specific gravity, the relatively heavier starch is easily separated from the lighter gluten by centrifugal force, yielding a gluten fraction and a starch fraction.

The fiber, germ and gluten fractions are obtained from the main slurry stream of the wet milling process as separated aqueous slurries which are to be dewatered. This water is subsequently removed via mechanical and thermal processes to achieve the desired moisture content of the final products. The dried fiber and gluten are sold directly as products. The dried germ is further processed to recover and refine the corn oil retained within.

The starch recovered in the wet milling process is further processed into other products; many starches are chemically modified to achieve specific functionality requirements. The bulk of the starch, however, is hydrolyzed into simple sugar (dextrose), then refined into dextrose-bearing corn syrups or further converted and refined to produce fructose-bearing corn syrups, both in liquid and crystalline form.

Maximizing starch recovery (or yield) is a primary objective of wet milling plants. The wet milling process does not allow for complete recovery of the starch contained in the kernels because of inefficiencies of the mechanical separation operation and the steeping process. The latter process (steeping) is primarily diffusion limited, while the former process has reached hydraulic and mechanical limitations through a continual improvement effort by the producers.

SUMMARY OF THE INVENTION

The present invention provides a process to enhance the physical separations in the wet milling process. This enhanced performance is particularly evident in an increase in the quantity of starch recovered per bushel of corn processed ("starch yield"). Specifically, a nonionic surfactant esterified with fatty (e.g. oleic) acids reduces the starch content of fiber in the wet milling process. In a preferred embodiment of the present invention, a combination of a fatty acid based nonionic surfactant and an antioxidant act to reduce the starch content of fiber in the wet milling process, thus increasing the quantity of starch recovered (i.e., the starch yield) for subsequent processing into higher value products. The components of the present invention may be added to the system in need of treatment in amounts of from about 100–500 ppm of nonionic surfactant and 10–50 ppm antioxidant.

DESCRIPTION OF THE PREFERRED EMBODIMENTS

The present inventor has discovered that a nonionic surfactant esterified with fatty acids or, alternatively a combination of a fatty acid based surfactant and an antioxidant act to reduce the starch content of fiber in the wet milling process, thereby increasing the quantity of starch recovered (i.e., the starch yield) for subsequent processing into higher value products. A preferred embodiment of the present invention includes a blend of sorbitan mono-oleate and butylated hydroxyanisole, which blend acts synergistically in the manner stated above.

EXAMPLES

Table I depicts the experimental results of various surfactants on the fiber/starch separation process. The treatments were added at a concentration of 500 ppm based on the total mass of the slurry.

TABLE I

FIBER/STARCH SEPARATION AID DEVELOPMENT

| Surfactant | Experimental Cake % Starch | Experimental Starch Recovery (Treat.-Avg. Control) |
|---|---|---|
| Nonionic | | |
| polyethylene glycol (PEG) mono-oleate | 29.59 | 5.87 |
| sorbitan mono-oleate | 31.12 | 3.63 |
| triglycerol mono-oleate | 31.18 | 3.41 |
| polyethoxylate ester of fatty acid | 33.74 | 1.30 |
| PEG mono-oleate | 32.88 | 0.86 |
| decaglycerol mono-oleate | 35.17 | 0.11 |
| hexaglycerol tetraoleate | 34.47 | −0.72 |
| decaglycerol decaoleate | 36.55 | −3.14 |
| PEG di-oleate | 37.56 | −4.89 |
| triglycerol tetralaurate | 37.37 | −8.19 |

TABLE I-continued

FIBER/STARCH SEPARATION AID DEVELOPMENT

| Surfactant | Experimental Cake % Starch | Experimental Starch Recovery (Treat.-Avg. Control) |
|---|---|---|
| Anionic | | |
| dioctyl sodium sulfosuccinate | 40.19 | −7.64 |
| Polymeric | | |
| acrylic acid/PEG allyl ether | 32.69 | 3.45 |
| EO-PO block copolymer | 43.92 | −12.99 |

As shown in Table I, the nonionic fatty-acid based surfactants were most effective in recovering more starch from the fiber-starch slurry. In particular, it is apparent that unsaturated fatty acid (i.e., oleic acid) esters of lower molecular weight polymers are more effective than saturated fatty acid (i.e., lauric acid) esters and materials of a higher molecular weight.

Table II depicts the experimental results of combinations of various surfactants and antioxidants on the fiber/starch separation process. The treatments were added at a concentration of 500 ppm based on the total mass of the slurry.

TABLE II

FIBER/STARCH SEPARATION AID DEVELOPMENT

| Treatment | Experimental Cake % Starch | Experimental Starch Recovery (Treat.-Avg. Control) |
|---|---|---|
| Butylated Hydroxyanisole (BHA) | 44.83 | −6.22 |
| BHA/$Na_2S_2O_5$ | 41.44 | 1.10 |
| Sorbitan mono-oleate, 250 ppm | 41.90 | 0.37 |
| Sorbitan mono-oleate, 500 ppm | 31.12 | 3.96 |
| Sorbitan mono-oleate/$Na_2S_2O_5$, 250/2375 | 45.57 | −3.98 |
| Sorbitan mono-oleate/BHA, 250/25 | 35.78 | 7.36 |
| Sorbitan mono-oleate/BHA, 500/25 | 38.67 | 4.36 |

As shown in Table II, BHA and sodium metabisulfite, individually and in combination produce no increase in starch recovery in the washing operation. Sorbitan mono-oleate by itself showed variable, but positive improvement in starch recovery. In contrast, combinations of sorbitan mono-oleate (e.g., 250 ppm) and BHA (e.g., 25 ppm) yield enhanced results, with an increase in starch recovery of greater than 7%.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method for reducing the starch content of fiber in the wet milling process, comprising adding to the fiber an amount, effective for the purpose of a combination of (a) about 100–500 ppm of a sorbitan mono-oleate and (b) a butylated hydroxyanisole.

2. The method as recited in claim 1 wherein from about 10–50 ppm of the butylated hydroxyanisole is added to the fiber.

3. A composition for reducing the starch content of fiber in the wet milling process comprising a combination of (a) about 100–500 ppm of a sorbitan mono-oleate and (b) a butylated hydroxyanisole.

* * * * *